United States Patent [19]

Sharif

[11] Patent Number: 5,160,445
[45] Date of Patent: Nov. 3, 1992

[54] BORATE CROSS-LINKING SOLUTIONS

[75] Inventor: Sharif Sharif, Midland, Tex.

[73] Assignee: Zirconium Technology Corporation, Midland, Tex.

[21] Appl. No.: 705,605

[22] Filed: May 24, 1991

[51] Int. Cl.$^5$ ............................................. E21B 33/138
[52] U.S. Cl. .......................... 252/8.551; 252/182.32; 252/182.34; 252/315.3
[58] Field of Search ........... 252/8.551, 182.32, 182.34, 252/315.3

[56] References Cited

U.S. PATENT DOCUMENTS

| | | | |
|---|---|---|---|
| 3,766,984 | 10/1973 | Nimerick | 166/294 |
| 3,794,115 | 2/1974 | Skagerberger | 166/294 |
| 3,800,872 | 4/1974 | Friedman | 166/270 |
| 3,974,077 | 8/1976 | Free | 166/283 |
| 4,428,432 | 1/1984 | Pabley | 166/302 |
| 4,464,270 | 8/1984 | Hollenbeak et al. | 166/308 |
| 4,488,601 | 12/1984 | Hammett | 166/273 |
| 4,543,131 | 9/1985 | Purinton, Jr. | 252/8.552 X |
| 4,553,601 | 11/1985 | Almond et al. | 166/308 |
| 4,609,475 | 9/1986 | Hanlon et al. | 252/8.552 |
| 4,610,795 | 9/1986 | Norris et al. | 252/8.551 |
| 4,619,776 | 10/1986 | Mondshine | 252/8.551 |
| 4,624,795 | 11/1986 | Dawson et al. | 252/8.553 |
| 4,766,959 | 8/1988 | Allison | 166/295 |
| 4,953,621 | 9/1990 | Putzig et al. | 166/308 |
| 5,026,735 | 6/1991 | Stern | 252/8.514 |

*Primary Examiner*—Robert L. Stoll
*Assistant Examiner*—C. Sayala
*Attorney, Agent, or Firm*—Milburn & Peterson

[57] ABSTRACT

A cross-linking system using boron alpha-hydroxy carboxylic acid salts is shown for use in a water based well treating fluid. The cross-linker will gel the water based fluid usually after a delay at a relatively neutral pH. The cross-linker is provided as a concentrated stable solution containing borate ion as boric acid in a concentration of from less than 1% up to 25% by weight. The cross-linking solution additionally may contain from 1% to 10% of EDTA and/or Glycerine, however, without these additives the cross-linking solution is stable through temperature changes and freeze-and-thaw cycles. Water based fracturing fluid is shown using galactomannan guar polymers, hydroxypropyl guar polymers or derivatives thereof.

10 Claims, No Drawings

BORATE CROSS-LINKING SOLUTIONS

FIELD OF THE INVENTION

The invention relates to various solutions containing borate ions for use primarily in aqueous, galactomannan gum polymers, hydroxypropyl guar (HPG) and carboxymethyl hydroxypropyl guar (CMHPG) polymers for cross-linking the polymers and creating delayed cross-linking mechanism.

BACKGROUND OF THE INVENTION

It is well known that boric acid is a very weak, inorganic acid and the borate ion does not exist as such until the pH is sufficiently high to react with more firmly bound second and third hydrogens. The borate ion complexes with many compounds, for example certain polysaccharides like guar and locust bean gum as well as polyvinyl alcohol. At a high pH above 8, the borate ion exists and is available to cross-link and cause gelling. At lower pH, the borate is tied up by hydrogen and is not available for cross-linking, thus gelation caused by borate ion is reversible.

According to Friedman, U.S. Pat. No. 3,800,872, if boric acid or borax is added to a 1% fully hydrated guar solution, the solution will gel. If, however, the procedure is reversed and one attempts to dissolve guar in a solution containing borax, hydration will not occur. The guar then appears to be water insoluble and no viscosity increases will be measured. The reason for this is that if the borate ion finds two or more guar molecules close together, there is a fair probability that it will link them together.

If, on the other hand, the borate gets to the slowly hydrating molecule before the guar molecules get close together to link, the intermolecular distances are too large to be spanned by the small borate ion. This causes the borate to use all its functional points to hook to one guar molecule shielding it from hydration. If a very dilute guar solution is allowed to fully hydrate and subsequently borated, the solution loses viscosity.

Another way in which borate ions form a complex is with a cis diol where two alcohol groups are on adjacent carbon atoms. If boric acid is added to a cis diol like glycerol, the resulting chelate holds the borate ion so tightly that the hydrogen becomes relatively labile. This makes a strong acid of boric acid. If a cis diol is added to a borate gel guar, the gel disappears because the diol attracts the borate more strongly then does the guar. Consequently, this aqueous gelling is a reversible process. Friedman goes on to discuss boric acid or borax as a cross-linker for aqueous flooding medium for an oil and gas reservoir.

Mondshine, U.S. Pat. No. 4,619,776, discloses that it is well known that organic polyhydroxy compounds having hydroxyl groups positioned in the cis-form on adjacent carbon atoms or on carbon atoms in a 1,3-relationship react with borates to form five or six member ring complexes. At alkaline pH's of above about 8, these complexes form dididols cross-link complexes. Mondshine goes on to state that such reversible reactions lead to a valuable reaction with disassociated borate ions in the presence of polymers having the required hydroxyl groups in a cis-relationship. The reaction is fully reversible with changes in pH. An aqueous solution of the polymer will gel in the presence of borate when the solution is made alkaline and will liquefy again when the pH is lowered below about 8. If the dried powder polymer is added to an alkaline borate solution, it will not hydrate and thicken until the pH has dropped below about 8. The critical pH at which gelation occurs is modified by the concentration of dissolved salts. The effect of the dissolved salts is to change the pH at which a sufficient quantity of disassociated boric ions exist in solution to cause gelation. The addition of an alkali metal base such as sodium hydroxide enhances the effect of condensed borate such as borax by converting the borax to the disassociated metaborate.

Known polymers which contain an appreciable content of cis-hydroxyl groups are exemplified by guar gum, locust bean gum, dextrin, polyvinyl alcohol and derivatives of these polymers. Derivatives tend to react less with the borate ion as the amount of substituting group in the molecule increases. This results because of the sheer bulk of substituting groups changes the regular alternating and simple number branched linear configuration of the molecule and prevents adjacent chains from approaching as closely as before and a substitution of secondary cis-hydroxyl positions decreases the number of such unsubstituted positions available for complexing with the borate ion. As further pointed out by Mondshine, hydraulic fracturing is a widely used method for stimulating petroleum producing subterranean formations and is commonly performed by contacting the formation with a viscous fracturing fluid having particulated solids, widely known as propping agents, suspended therein applying sufficient pressure to the fracturing fluid to open a fracture in the subterranean formation and maintaining this pressure while injecting the fracturing fluid into the fracture at a sufficient rate to extend the fracture into the formation. When the pressure is reduced, the propping agents within the fracture prevent the complete closure of the fracture.

The properties that a fracturing fluid should possess are, among others, a low leak-off rate, the ability to carry a propping agent, low pumping friction loss and it should be easy to remove from the formation. Low leak-off rate is a property that permits the fluid to physically open the fracture and one that controls its areal extent. The ability of the fluid to suspend a propping agent is controlled by additions. Essentially, this property of the fluid is dependent upon the viscosity and density of the fluid and upon its velocity. Friction reducing additives are added to fracturing fluids to reduce pumping loss due to friction by suppression of turbulence in the fluid. To achieve maximum benefit from fracturing, the fracturing fluid must be removed from the formation. This is particularly true with the viscous fracturing fluids. Most such viscous fluids have built in breaker systems that reduce the viscosity gels to low viscosity solutions upon exposure to temperatures and pressures existing in the formation. When the viscosity is lowered, the fracturing fluid may readily be produced from the formation. Mondshine states that he has found that superior guar containing hydraulic fracturing fluids having enhanced thermal stability and decreased leak-off rate can be obtained utilizing ½ to 15 kilograms per cubic meter of sparingly soluble borate having a slow solubility rate to provide sufficient borate ions to cross-link the guar polymer, raise the pH, and provide a reserve of available borate ions to cross-link the polymer at high temperatures. Mondshine goes on to suggest that alkaline earth metal borates or alkali metal alkaline earth metal borates have unique solubility characteristics which enable them to be used in the control cross-linking of aqueous systems containing guar polymers. The rate of cross-linking can be controlled by suitable adjustment of one or more of the following variables: initial pH of the aqueous solutions system, relative concentration of one or more of the sparingly soluble borates, the temperature of the borates, temperature of the aqueous system and particle size of the borate. In the patent, the inventor further describes a series of sparingly soluble borates for use in fracturing fluids.

On occasion, it is desirous to temporarily seal or plug a permeable formation located in a subterranean oil and gas formation having a bore hole therein. This may be done for several purposes such as, for example, so that other less permeable zones can be treated in some manner, i.e. fractured, acidized, etc. Many methods and compositions have been employed for temporarily plugging or sealing the openings or passageways located in such formations. Nimerick, U.S. Pat. No. 3,766,984 discusses at length the use of gels such as cross-link polysaccharides, and Nimerick suggests the use of an aqueous slurrying, composition containing a portion of the constituents of a granulated composition comprised of a galactomannan gum which has been treated with hydrophobing agent to render the gum hydrophobic (less hydrophilic than normal) when disbursed in an aqueous solution having a pH of at least 7.5, a pH control agent and a water soluble organic polymer suspending agent. Optionally, a degrading agent for a hydrated form of the gum and/or a cross-linking agent for hydrated gum and/or hydration agents can be employed.

Skagerberg, U.S. Pat. No. 3,794,115 describes a relatively low concentration of polymer which can be pumped through the system without using excessive high pressure and goes on to list numerous polymers suitable for use in aqueous solutions for forming bore hole plugs and further suggests the use of borax glass as one of a number of cross-linking agents including antimony and chromic ions.

SUMMARY OF THE INVENTION

I have now found that concentrated, stable solutions of boric acid can be prepared through an in-situ formation of an alkali metal or ammonium salt of an alpha-hydroxy carboxylic acid such as citric, lactic and tartaric, in an aqueous, boric acid slurry. This invention involves slurrying relatively large quantities of boric acid or borax solids in an aqueous solution of the alpha-hydroxy carboxylic acid followed by the addition of sodium, potassium or ammonium hydroxide (for the in-situ formation of the acid salt) till a pH of at least 6.5 is established. This method of preparing produces a clear, stable solution of boric acid with an almost neutral pH. Other substances useful in this invention to increase or establish the pH are: sodium, potassium, ammonium carbonate or bicarbonate and water-soluble amines and amine derivatives. Experimental results indicate good stability of these solution products from this new method of preparation on aging and through freeze and thaw cycles. Using this invention, boric acid cross-linkers can be made in an aqueous, stable and neutral solution at concentrations from less than 1% of up to 25% boric acid by varying the boric acid to alpha-hydroxy carboxylic acid molar ratios. These solutions have been demonstrated to be stable in excess of six months and cycle through at least three freeze and thaw cycles.

Thus, I have discovered these stable, concentrated boric acid solutions prepared in accordance with the present invention have the unique characteristic of cross-linking neutral-pH guar and substituted guar gum solutions providing delayed cross-linking action, without the addition of buffers to the frac fluid prior to the cross-linkers addition.

Thus, I have discovered a new borate ion solution which remains stable over an extended period of time and through temperature extremes at a relatively neutral pH which can be used with the numerous guar and guar derivatives solutions.

I believe the neutral-pH cross-linking occurs as a result of the formation of pseudo cationic bonding sites on the polymer "backbone". Using sodium boron lactate, the proposed type of bonding can be presented by the following steps:

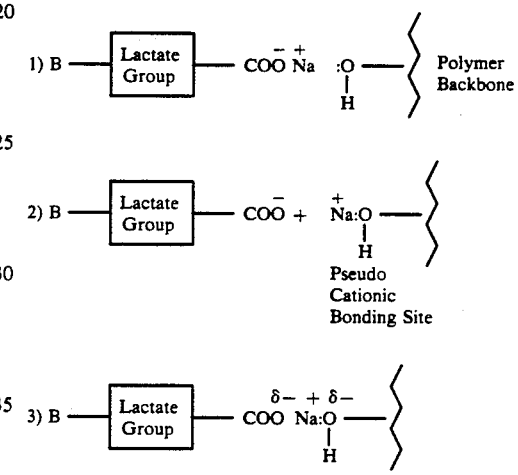

As the sodium ion approaches the hydroxy group on the polymer, an electrostatic bond occurs with the oxygen of the hydroxyl group on the polymer at 1) forming a pseudo cationic bonding site at 2). The carboxy group ($CO\overline{O}$) approaches this pseudo cationic bonding site and the carboxy group and the hydroxyl group share the sodium cation.

This pseudo cationic electrostatic bonding gels the polymer usually after a period of delay. In addition, as or if the pH is increased, the usual boron type of cross-linking occurs, as well as continue bonding of carboxyl and sodium at the pseudo cationic bonding site.

DESCRIPTION OF PREFERRED EMBODIMENT

Concentrated, stable solutions of boric acid were prepared through an in-situ formation of an alkali metal or ammonium salt of an alpha-hydroxy carboxylic acid such as citric, lactic, and tartaric in an aqueous boric acid slurry. This invention involves slurrying relatively large quantities of boric acid or borax solids in a concentrated aqueous solution of the alpha-hydroxy carboxylic acid, followed by the addition of sodium, potassium, or ammonium hydroxide (for the in-situ formation of the acid salt) till a pH of at least 6.5 is established. This method of preparation produces a clear, stable solution of boric acid with almost a neutral pH. Experimental results indicated good stability of these solution products from this new method of preparation, on aging and/or freeze-and-thaw cycles.

EXAMPLE 1

The following example illustrates the new method of preparation: 600 gm of 50% citric acid was diluted with 840 gm of water. Then 400 gm of granular boric acid was slurried in the aqueous citric acid solution. 408 gm of 50% sodium hydroxide was gradually added to the slurry with continuous mixing. Heat was generated as a result of neutralizing the citric acid with 50% sodium hydroxide. The boric acid in the slurry gradually dissolved while NaOH was being added. When the addition of NaOH was completed, all of the boric acid dissolved, and a neutral, stable solution of boric acid was obtained. Similar results were obtained when granular boric acid was slurried initially in the water, followed by the addition of the 50% citric acid.

In the above example, lactic acid or tartaric acid can be substituted for citric acid. Potassium or ammonium hydroxide can be substituted for sodium hydroxide to obtain similar stable products. In the above example, the boric acid concentration in the final solution product was 17.8% and the product was stable for at least six months and/or at least three freeze-and-thaw cycles. Using this new method, boric acid can be made in an aqueous, stable and neutral solution form at a concentration of up to 25% through varying the $B(OH)_3$: alpha-hydroxy carboxylic acid: hydroxide molar ratios. These stable boric acid solutions can be prepared through the in-situ formation of any or a combination of the following salts:

Sodium Citrate
Sodium Lactate
Sodium Tartrate

Potassium Citrate
Potassium Lactate
Potassium Tartrate

Ammonium Citrate
Ammonium Lactate
Ammonium Tartrate

Laboratory experimental results indicate that the concentrated boric acid solutions prepared using these new methods are effective as delayed cross-linking agents for guar and HPG solutions. This delayed action can be utilized in fracturing fluids in the oil field and similar rheological applications.

In another embodiment of the invention, four different products were prepared using similar techniques. The first product was self-stabilized. The second contains approximately 5% ethylenediaminetetraacetic acid salt. The third contains approximately 5% glycerine. The fourth contains approximately 5% ethylenediaminetetraacetic acid salt and 5% glycerine for further stabilization towards aging and freeze-and-thaw cycles. The percentage of EDTA may be between 1% and 10% and the Glycerine may be between 1% and 10%. Wherever hereinafter EDTA is used, it is meant the salt of ethylenediaminetetraacetic acid. The initial objective of making these products was to prepare stable, soluble concentrated boric acid solutions. Their unique characteristics of cross-linking neutral-pH guar solutions, and their delayed cross-linking action was discovered.

EXAMPLES II THROUGH V

II. Preparation of sodium-boron citrate from boric acid (BXL).
a.) Ingredients
500 g of 50% Citric Acid
400 g of Boric Acid
735 g of distilled water (varies to yield 20% $B(OH)_3$ in the product)
370 g of 50% NaOH solution (or the amount required to raise the pH to 6.0–6.5)
Batch wt. = 2005 g
$B(OH)_3$ in product = 20.0%
b.) Procedure
1. 500 g of 50% Citric Acid was diluted with 735 g of water.
2. 400 g of Boric Acid was added and the batch was mixed for two hours.
3. 370 g of 50% NaOH was gradually added to the reaction batch to establish a pH of 6.0–6.5 in the product. Mix for thirty minutes and was readjusted to pH to 6.0–6.5 with 50% NaOH.

III. Preparation of Sodium Boron Citrate containing EDTA (BXL-EDTA).
a.) Ingredients
500 g of 50% Citric Acid
641 g of water (or the amount to yield 20% $B(OH)_3$ in the product)
370 g of 50% NaOH (or the amount to establish a pH of 6.0–6.5 in the final product)
400 g of Boric Acid
94 g of EDTA (ethylene diamine tetracetic acid) sodium salt
Batch Weight = 2005 g
$B(OH)_3$ in product = 20.0%
EDTA in product = 4.7%
b.) Procedure
1. 500 g of 50% Citric Acid was diluted with 641 g of water.
2. 400 g of Boric Acid was added, and batch was mixed for two hours.
3. 94 g of EDTA was added and mixed for thirty minutes.
4. 370 g of 50% NaOH solution (the amount required to raise the pH to 6.0–6.5) was added and mixed for thirty minutes. The batch pH was then checked and readjusted to 6.0–6.5 with 50% NaOH, as needed.

IV. Preparation of Sodium Boron Citrate containing Glycerine (BXL-GLY).
a.) Ingredients
500 g of 50% Citric Acid
641 g of water (or the amount to yield 20% $B(OH)_3$ in the product)
370 g of 50% NaOH (or the amount to establish a pH of 6.0–6.5 in the final product)
400 g of Boric Acid
94 g of Glycerine
Batch Weight = 2005 g
$B(OH)_3$ in product = 20.0%
Glycerine in product = 4.7%
b.) Procedure
1. 500 g of 50% Citric Acid was diluted with 641 g of water.
2. 400 g of Boric Acid was added, and batch was mixed for two hours.
3. 94 g of glycerine was added and mixed for thirty minutes.
4. 370 g of 50% NaOH solution (the amount required to raise the pH to 6.0–6.5) was added and mixed for thirty minutes. The batch pH was then checked and readjusted to 6.0–6.5 with 50% NaOH, as needed.

Preparation of Sodium Boron Citrate containing EDTA and Glycerine (BXL-EDTA/GLY).

a.) Ingredients
500 g of 50% Citric Acid
370 g of 50% NaOH solution
547 g of water
94 g of EDTA
94 g of Glycerine
400 g of boric acid
Batch weight=2005 g
B (OH)$_3$ in product=20.0%
EDTA in product=4.7%
Glycerine in product=4.7% b.) Procedure
1. 500 g of 50% Citric Acid was diluted with 547 g of distilled water.
2. 400 g of Boric Acid was added, and the batch was mixed for two hours. 370 g of 50% NaOH was gradually added with mixing to the reaction batch.
3. 94 g of glycerine was added, and the batch was mixed for thirty minutes.
4. 94 g of EDTA was added, and the batch mixed for thirty minutes.
5. 370 g of 50% NaOH was gradually added (the amount required to raise the pH to 6.0-6.5, and the batch was mixed for thirty minutes.

The four products were stable on aging for at least 6 months to 1 year and through at least three freeze-and-thaw cycles.

The first product (Example II) and fourth product (Example V), sodium boron citrate and sodium boron citrate which contains EDTA and glycerine, respectively, were given the identification BXL and BXL-EDTA/GLY, respectively. These products were evaluated as delayed cross-linking agents for guar solutions under various cross-linking conditions. Usually, the galactomannan gum polymers such as guar gum, hydroxypropyl guar (HPG) and carboxymethyl hydroxypropyl polymers are dissolved in water to form the base gel. The ratio is between 20 to 60 pounds of polymer per 1000 gallons of water. Thus, the polymers have a concentration between 0.24 to 0.72 percent by weight. Optionally, 2% KCl is added as a clay stabilizer and optionally, a buffer is added. The cross-linker in frac fluids is usually about one to three gallons per thousand gallons of frac fluid. In the particular evaluation following, the base gel guar contained 40 pounds of guar per 1000 gallons of water.

Evaluation of BXL as a delayed cross-linking agent

The effectiveness of BXL as a delayed cross-linking agent at almost neutral pH, and at various loadings was investigated. The results in the tests set forth herein were obtained using an overhead mixer with the rheostat setting at 60 (high voltage). The cross-linking time was measured from the second the cross-linker was added to the second at which the gel started to climb the shaft. The gel strength was visually evaluated by the gel appearance and its behavior when poured out of the container. 750 ml of the base gel was used in every test. The pH of the base gel varied between 6.0-7.0 in various preparations. The product has shown a desirable and unusual behavior of slow cross-linking of guar solutions at almost neutral pH. The following data in Table I shows the variation of the cross-linking time with the BXL loading at almost neutral pH. Through several preparations, pH of BXL varied between 7.0-7.5. Later work had proved that higher stability of BXL and slower cross-linking action can be obtained by preparing the product at a pH of 6.0-6.5.

TABLE I

| LOADING Gal/1000 gal OF BXL | PH IMMEDIATELY AFTER THE ADDITION AND MIXING OF BXL | CROSS-LINKING TIME min sec | COMMENTS ON GEL STRENGTH (at room temp.) |
|---|---|---|---|
| ⅜ | 7.2 | 04  01 | The produced gel was weak |
| 1 | 7.3 | 02  25 | The produced gel was weak |
| 1⅜ | 7.3 | 01  59 | The produced gel was weak |
| 2⅜ | 7.5 | 01  28 | The produced gel was weak |

The obtained gels were relatively weak compared to conventional borate gels. Higher loadings of BXL than 1⅜ gal/1000 gal (2-3 gal) produced satisfactory gels.

Evaluation of BXL-EDTA/GLY as a delayed cross-linking agent.

The effectiveness of BXL-EDTA/GLY as a delayed cross-linking agent at almost neutral pH, and at various loadings was investigated. The results in the tests set forth herein were obtained using an over-head mixer with the rheostat setting at 60 (high voltage). The cross-linking time was measured from the second the cross-linker was added to the second at which the gel started to climb the shaft. The gel strength was visually evaluated by the gel appearance and its behavior when poured out of the container. 750 ml of the base gel was used in every test. The pH of the base gel varied between 6.0-7.0 in various preparations. The product has shown a desirable and unusual behavior of slow cross-linking of guar solutions at almost neutral pH. The following data in Table II shows the variation of the cross-linking time with the BXL-EDTA/GLY loading at almost neutral pH. Through several preparation, pH of BXL-EDTA/GLY varied between 7.0-7.5. Later work had proved that higher stability of BXL-EDTA/GLY and slower cross-linking action can be obtained by preparing the product at a pH of 6.0-6.5.

TABLE II

| LOADING Gal/1000 gal OF BXL-EDTA/GLY | PH IMMEDIATELY AFTER THE ADDITION AND MIXING OF BXL-EDTA/GLY | CROSS-LINKING TIME min sec | COMMENTS ON GEL STRENGTH (at room temp.) |
|---|---|---|---|
| ⅜ | 7.2 | 04  01 | The produced gel was weak |
| 1 | 7.3 | 02  25 | The produced gel was weak |
| 1⅜ | 7.3 | 01  59 | The produced gel was weak |
| 2⅜ | 7.5 | 01  28 | The produced gel was weak |

The obtained gels were relatively weak compared to conventional borate gels. Higher loadings of BXL-EDTA/GLY than 1⅜ gal/1000 gal (2-3 gals) produced satisfactory gels.

Effects of different chemicals on the cross-linking time and gel strength using BXL-EDTA/GLY (a) 10% soda ash solution The loading of 1 gal/1000 gal of BXL-EDTA/GLY was used in this study. The loading of 10% $Na_2CO_3$ solution was varied, and the corresponding cross-linking time was measured. The results obtained are listed below in Table III.

TABLE III

| 10% SO-DIUM CAR-BONATE LOADING gal/1000 gal | PH AFTER ADDING CROSS-LINKER SODIUM CARBONATE SOLUTION | CROSS-LINKING TIME min | sec | COMMENTS |
|---|---|---|---|---|
| 0.0 | 7.3 | 2 | 25 | weak gel |
| ¼ | 8.1 | 1 | 24 | medium strength gel |
| ½ | 9.0 | 0 | 55 | stronger than above |
| 1 | 9.3 | 1 | 6 | stronger than above |
| 1½ | 9.5 | 1 | 5 | medium strength gel |
| 2½ | 9.7 | 1 | 12 | medium strength gel |

Gradual increase of the loading of 10% $Na_2CO_3$ solution to one gal/1000 gal caused higher pH in the base gel. This resulted in shorter cross-linking time and stronger gels. Some of BXL-EDTA/GLY delayed action must be traded off to obtain usable gels. Based on the obtained results, increasing the soda ash solution loading to over one gal/1000 gal has very little effect on the cross-linking time, and weaker gels are produced.

(b) 10% Sodium Diacetate Solution

Ten percent solution of sodium diacetate was prepared and used in this investigation. One gal/1000 gal of BXL-EDTA/GLY was utilized in all the tests. The results obtained are listed in the following table IV.

TABLE IV

| gal/1000 gal OF 10% SODIUM DIACETATE SOLUTION | PH AFTER DIACETATE IS ADDED (BEFORE BXL-EDTA/GLY | CROSS-LINKING TIME min | sec | COMMENTS |
|---|---|---|---|---|
| 0.0 | 7.3 | 2 | 25 | weak gel |
| ¼ | 7.8 | 3 | 25 | weaker gel |
| ½ | 7.8 | 9 | 14 | weaker gel |
| 1 | 7.3 | No vortex closure up to 15 minutes | | very weak gel |

The addition of sodium diacetate solution delays the cross-linking action of BXL-EDTA/GLY. Weaker gels are produced when sodium diacetate is used, to further delay the cross-linking action of BXL-EDTA/GLY. Higher loadings than 1 gal/1000 gal of BXL-EDTA/GLY are required to produce usable gels, at pH 7.0–7.8, at room temperature.

The ensuing examples describe preparation of other boron alpha hydroxy carboxylic acid salt solutions. These solutions provide similar results as the previous solutions.

EXAMPLES VI THROUGH IX

VI. Using Lactic Acid (i) 364 gm of 88% lactic acid is diluted with 236 gm of distilled water;

(ii) 200 gm of granular boric acid is added and mixed to obtain a uniform slurry;

(iii) 48 gm of ethylenediaminetetraacetic acid sodium salt is added and mixed in the reaction batch;

(iv) 48 gm of glycerin is added and mixed in the reaction batch;

(v) 275 gm of 50% sodium hydroxide solution is gradually added while mixing;

(vi) 322 gm of water was added and mixed in the batch.

The obtained product was a clear and stable solution. It has a pH of 7.5 and it contains 13.4 $B(OH)_3$.

VII. Using Tartaric Acid (i) 175 gm of granular tartaric acid is dissolved in 329 gm of distilled water;

(ii) 200 gm of boric acid was added and mixed to obtain a uniform slurry;

(iii) 48 gm of ethylenediamine tetracen acid sodium salt was added and mixed in the reaction batch;

(iv) 48 gm of glycerin was added and mixed in the reaction batch;

(v) 215 gm of 50% sodium hydroxide solution was gradually added, while mixing;

(vi) 158 gm of distilled water was added and mixed in the reaction batch.

The obtained product was a clear and stable solution. It has a pH of 7.5 and it contains 17.1% $B(OH)_3$.

VIII. Using Ammonium Hydroxide Instead of Sodium Hydroxide (i) 175 gm of granular tartaric acid is dissolved in 329 gm of distilled water;

(ii) 200 gm of boric acid was added and mixed to obtain a uniform slurry;

(iii) 48 gm of ethylenediamine tetracetic acid sodium salt was added and mixed in the reaction batch;

(iv) 48 gm of glycerin was added and mixed in the reaction batch;

(v) 326 gm of concentrated ammonium hydroxide solution (28% $NH_3$) was gradually added, while mixing.

The obtained solution product was clear and stable. It has a pH of 7.2 and it contains 17.8% $B(OH)_3$.

IX. Using Borax Instead of Boric Acid (i) dilute 364.3 gm of 88% lactic acid with 235.7 gm of distilled water;

(ii) slurry 308.4 gm of borax (36.5%, $B_2O_3$) and mix for 10 minutes;

(iii) add 47.6 gm of ethylenediamine tetracetic acid sodium salt and mix in the reaction batch;

(iv) add 47.6 gm of glycerin and mix in the reaction batch;

(v) gradually add 81 gm of 50% sodium hydroxide solution and mix in the reaction batch.

The obtained product was clear and stable. It has a pH of 7.5 and it contains 18.4% $B(OH)_3$.

What is claimed is:

1. A method of preparing a boron cross-linking solution for gelling aqueous treating fluids containing hydratable polymers for treating oil and gas reservoirs comprising:

Slurrying boric acid in an aqueous solution of an alpha-hydroxy carboxylic acid at a concentration of from less than 1% up to 25% by weight to form a boron alpha hydroxy carboxylate;

Adding sodium hydroxide, potassium hydroxide, or ammonium hydroxide, sodium carbonate, potassium carbonate, ammonium carbonate, sodium bicarbonate, potassium bicarbonate, ammonium bicarbonate, or water soluble amine or amine derivative until the pH of the aqueous solution is at least 6.5 and all the boron has reacted to form the corresponding boron alpha hydroxy carboxylic acid salt of the alkali metal, ammonia or water soluble amine or amine derivative.

2. The method of preparing boron cross-linking solution in accordance with claim 1 wherein between 1% to 10% ethylenediaminetetraacetic acid salt of an alkali metal or ammonia is added to the solution.

3. The method of preparing a boron cross-linking solution in accordance with claim 1 wherein between 1% to 10% Glycerine are added to the solution.

4. The method of preparing a boron cross-linking solution of claim 1 wherein 1% to 10% ethylenediaminetetraacetic acid salt of an alkali metal or ammonia and 1% to 10% Glycerine is added to the solution.

5. A composition made in accordance with the method of claim 1.

6. A method of preparing a boron cross-linking solution for gelling aqueous treating fluids containing hydratable polymers for treating oil and gas reservoirs comprising:

Slurrying a source of boron selected from boric acid, borax and mixtures thereof, in an aqueous solution of an alpha-hydroxy carboxylic acid at a concentration of from less than 1% up to 25% by weight to form a boron alpha hydroxy carboxylate;

Adding sodium hydroxide, potassium hydroxide, ammonium hydroxide, sodium carbonate, potassium carbonate, ammonium carbonate, sodium bicarbonate, potassium bicarbonate, ammonium bicarbonate, or water soluble amine or amine derivative until the pH of the aqueous solution is at least 6.5 and all the boron has reacted to form the corresponding boron alpha hydroxy carboxylic acid salt of the alkali metal, ammonia or water soluble amine or amine derivative.

7. The method of preparing boron cross-linking solution in accordance with claim 6 wherein between 1% to 10% ethylenediaminetetraacetic acid salt of an alkali metal or ammonia is added to the solution.

8. The method of preparing a boron cross-linking solution in accordance with claim 6 wherein between 1% to 10% Glycerine is added to the solution.

9. The method of preparing a boron cross-linking solution of claim 6 wherein 1% to 10% ethylenediaminetetraacetic acid salt of an alkali metal or ammonia and 1% to 10% Glycerine is added to the solution.

10. A composition made in accordance with the method of claim 6.

* * * * *